United States Patent
Alsheimer

(10) Patent No.: US 12,434,238 B2
(45) Date of Patent: Oct. 7, 2025

(54) IMAGING SYSTEM AND METHOD FOR IMAGING BIOLOGICAL SAMPLES TRANSPORTED IN A FLUID

(71) Applicant: LEICA MICROSYSTEMS CMS GMBH, Wetzlar (DE)

(72) Inventor: Soeren Alsheimer, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 369 days.

(21) Appl. No.: 18/079,020

(22) Filed: Dec. 12, 2022

(65) Prior Publication Data
US 2023/0191404 A1    Jun. 22, 2023

(30) Foreign Application Priority Data
Dec. 16, 2021  (EP) .................................... 21215111

(51) Int. Cl.
*B01L 3/00* (2006.01)
*G01N 15/14* (2024.01)
*G01N 15/10* (2006.01)
*G01N 15/1434* (2024.01)

(52) U.S. Cl.
CPC ... *B01L 3/502715* (2013.01); *B01L 3/502761* (2013.01); *G01N 15/1459* (2013.01); *B01L 2400/0415* (2013.01); *B01L 2400/0454* (2013.01); *B01L 2400/0463* (2013.01); *G01N 2015/1006* (2013.01); *G01N 2015/1447* (2013.01); *G01N 2015/1452* (2013.01)

(58) Field of Classification Search
None
See application file for complete search history.

(56) References Cited

U.S. PATENT DOCUMENTS

| | | |
|---|---|---|
| 2005/0085708 A1 | 4/2005 | Fauver et al. |
| 2009/0208072 A1 | 8/2009 | Seibel et al. |
| 2011/0181884 A1 | 7/2011 | Cui et al. |
| 2012/0196320 A1 | 8/2012 | Seibel et al. |
| 2014/0071452 A1* | 3/2014 | Fleischer ............. G01N 15/147 356/436 |
| 2014/0315238 A1* | 10/2014 | Farrell ................. G01N 15/147 435/29 |
| 2015/0211981 A1 | 7/2015 | Pampaloni et al. |
| 2017/0131534 A1 | 5/2017 | Lippert et al. |
| 2019/0250093 A1* | 8/2019 | Hart ....................... G01N 15/00 |
| 2020/0182788 A1 | 6/2020 | Shaked |
| 2020/0284715 A1* | 9/2020 | Kalkbrenner ...... G02B 21/0032 |
| 2021/0025866 A1* | 1/2021 | Pangarkar ......... B01L 3/502715 |

FOREIGN PATENT DOCUMENTS

| | | |
|---|---|---|
| EP | 4067866 A1 | 10/2022 |
| WO | WO 2015/076251 A1 | 5/2015 |
| WO | WO 2020/126634 A2 | 6/2020 |
| WO | WO 2022/207125 A1 | 10/2022 |
| WO | WO 2022/242853 A1 | 11/2022 |

* cited by examiner

*Primary Examiner* — Thomas D Lee
(74) *Attorney, Agent, or Firm* — LEYDIG, VOIT & MAYER, LTD.

(57) ABSTRACT

An imaging system for imaging biological samples includes at least one main channel including at least one imaging space, the at least one main channel configured to transport the samples in a fluid, at least one reorientation unit configured to manipulate an orientation of the samples in the fluid, and at least one imaging unit configured to receive detection light emitted by the samples in the at least one imaging space.

14 Claims, 3 Drawing Sheets

IMAGING SYSTEM AND METHOD FOR IMAGING BIOLOGICAL SAMPLES TRANSPORTED IN A FLUID

CROSS REFERENCE TO PRIOR APPLICATION

This application claims benefit to European Patent Application No. EP 21215111.2, filed on Dec. 16, 2021, which is hereby incorporated by reference herein.

FIELD

The invention relates to an imaging system for imaging biological samples comprising a main channel for transporting the samples in a fluid, a reorientation unit for manipulating the orientation of the samples and an imaging unit. In a further aspect a method for imaging biological samples with the imaging system is provided.

BACKGROUND

Recent progress in the fields of cell culture research has led to the advent of 3D cell culture, which is based on cultivating cells in three dimensions, for example, in suspension culture (scaffold-free techniques) or embedded in hydrogels and/or extracellular matrices (scaffold-based techniques). Further, cultivation of a plurality of single cells or cell clusters such as spheroids is enabled by these techniques. It is often desirable to frequently analyze, in particular individually image, these single cells or cell clusters in order to track growth or viability, for example.

Microplates are frequently used in research and development particularly in the life sciences and pharmaceutical industry. A specific application of microplates is in the fields of high-throughput cell culture, cell assays and cell analysis. More recently, suspension 3D cell culture methods have been developed that allow culturing of cells and cell clusters, such as spheroids, in microplates. The microplates generally comprise a plurality of cavities for separately culturing the spheroids. Imaging analysis of these cells and cell cluster is often done inside the cavities of the micro-plates.

However, it is often desirable to culture cells and cell clusters in suspension and in vessels such as stirred tanks, spinner flask or wave bags, rather than microplates, for example, during development of biopharmaceutical processes and their scale-up. At the same time, it is equally desirable to be able to frequently analyze these cell cultures at the single cell or cell cluster level without a requirement for mounting samples in dedicated imaging vessels or formats. Further, there is a need for high-throughput systems, that enable fast and accurate analysis, in particular imaging, of these suspension cell cultures.

SUMMARY

In an embodiment, the present disclosure provides an imaging system for imaging biological samples. The imaging system includes at least one main channel including at least one imaging space, the at least one main channel configured to transport the samples in a fluid, at least one reorientation unit configured to manipulate an orientation of the samples in the fluid, and at least one imaging unit configured to receive detection light emitted by the samples in the at least one imaging space.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
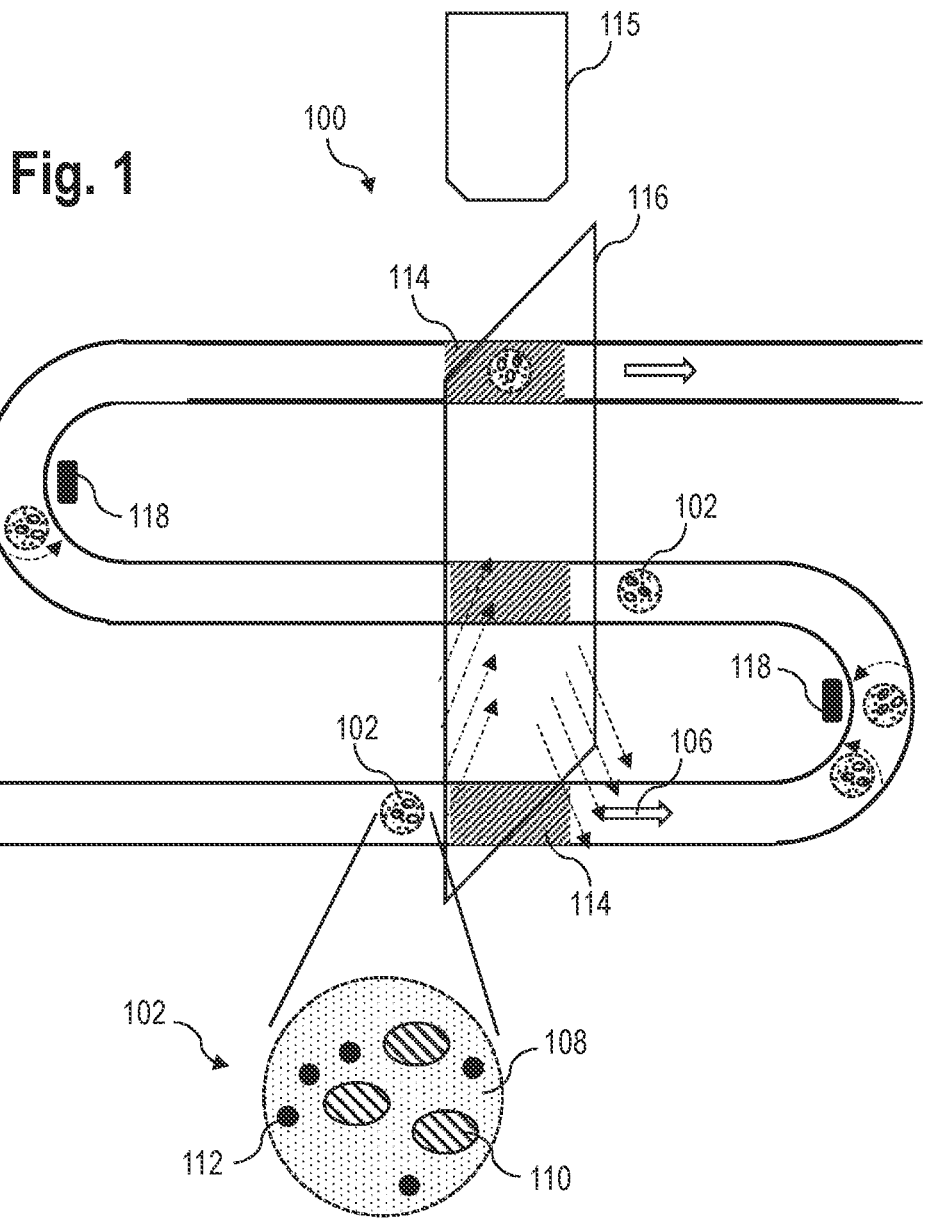
FIG. 1 shows a schematic representation of an imaging system according to a first embodiment.

Embodiments of the present invention can provide an imaging system and a method for imaging of biological samples that enables high-throughput imaging of biological samples suspended in a fluid.

An imaging system for imaging biological samples is provided comprising: at least one main channel having at least one imaging space and configured to transport the samples in a fluid; at least one reorientation unit configured to manipulate or to change the orientation of the samples in the fluid; and at least one imaging unit configured to receive detection light emitted by the biological samples or originating from the biological samples in the imaging space for imaging the biological samples. The fluid may for example be an aqueous liquid. When the fluid flows through the main channel, the biological samples are transported through the main channel. The flow of the fluid may be generated by negative or positive pressure, for example, by a pressure source such as a pump connected to the main channel. The imaging system may be part of a microfluidic system. The pump may be part of the microfluidic system. The main channel may be microfluidic channel. By means of the reorientation unit the biological sample may be rotated around a rotation axis of the biological sample, and in a particular embodiment, when the sample are in the fluid. Thus, this enables individually adjusting the orientation of the biological samples before and/or after imaging of the biological samples. In a particular embodiment, after imaging of a particular one of the biological samples the respective biological sample may be orientated in response to the image data gathered during imaging of that biological sample, for example, for a subsequent analysis of the reoriented biological sample. The imaging space may be a section of the main channel, and in a particular embodiment, a section of the main channel comprising a transparent wall of the main channel. Through this transparent wall the biological samples may be imaged. The transparent wall of the may be made of glass, polycarbonate, cyclic olefin, cyclic olefin copolymers, fluorinated ethylene propylene or polydimethylsiloxane, for example. The imaging space may also be termed a flow cell. The biological sample may also be illuminated with illumination light in the imaging space. The imaging system may be part of a microfluidic system. The main channel may have a cross sectional area in a range between 100 µm2 and 1 mm2. In a preferred embodiment, the main channel may have a cross sectional area in a range be-tween 300 µm2 and 0.3 mm2.

In a preferred embodiment, the main channel comprises at least two imaging spaces separated from each other. This enables more detailed coverage of the biological samples or acquiring at least two different images of the same biological sample, e.g. from different perspectives, when imaging them by imaging each biological sample twice, once in each imaging space.

In a preferred embodiment, the imaging unit is configured to receive the detection light emit-ted by the biological samples or originating from the biological samples in the at least two imaging spaces. This enables more efficient imaging of the biological samples by using a single imaging unit.

In a preferred embodiment the reorientation unit is arranged between the at least two imaging spaces of the main channel. This enables imaging the biological samples in at least two different orientations or rather from at least two different directions. Further, this enables orienting the biological samples in a particular orientation in response to initial image data before a subsequent imaging.

In a preferred embodiment, the imaging system comprises at least two imaging units, each configured to receive the detection light emitted by the biological samples in at least one of the imaging spaces of the main channel. This enables particularly high-quality imaging of the biological samples. Further, this enables particularly high throughput imaging of the biological samples.

In a preferred embodiment, at least one of the imaging units is configured to capture a z-stack of the biological samples. The z-stack, or image stack, comprises a plurality of images, and in a particular embodiment, of parallel images. Such a z-stack enables generating a three-dimensional representation of the respective biological sample. The acquisition of such a z-stack or the plurality of images might make use of the movement of the biological samples in the fluid through the imaging space by time sequentially acquiring single images or image planes or image sections of a biological sample with the imaging unit. The flow direction of the fluid may be parallel to the z-direction of the resulting z-stack or the orientation of a detection plane and/or an illumination plane might comprise an angle between 10 and 90 degrees to the flow direction in the imaging space.

In a preferred embodiment, at least one of the imaging units comprises a light sheet microscope. A detection plane and/or an illumination plane of the light sheet microscope are arranged at least partially in the imaging space. In a particular embodiment, the imaging unit might be embodied as e.g. described in the application having the application number EP21200992 or as described in the application having the application number EP21201008, the content of each is fully incorporated herein by reference. Thus, as the biological sample is transported through the imaging space, the sample is moved through the detection plane of the microscope. This enables particular efficient generation of a plurality of parallel images of the biological samples, also termed image stack, which enables generating a three-dimensional representation of the respective biological sample.

In a preferred embodiment, the reorientation unit comprises a circulation channel that is in fluid connection with the main channel upstream and/or down-stream of one of the imaging spaces. The fluid may be circulated through the circulation channel such that the biological samples are recirculated to pass the one of the imaging spaces several times. The dimensions of the circulation channel may preferably be the same as the dimensions of the main channel. A routing unit may be provided to—preferably selectively— route biological samples through the circulation channel or the main channel. This enables imaging the biological samples repeatedly with a single imaging space.

In a preferred embodiment, the imaging system comprises at least two main channels. In a particular embodiment, the at least two main channels are parallel to each other. This enables increasing the throughput of the imaging system.

In a preferred embodiment, the imaging unit is configured to receive the detection light emit-ted by the biological samples in at least one of the imaging spaces of each main channel. This enables particularly efficient imaging.

In a preferred embodiment, the reorientation unit is configured to manipulate the orientation electrodynamically. For example, the reorientation unit may generate an electric field, a magnetic field, and/or an electromagnetic field in the channel in order to manipulate the orientation of the biological samples. The biological samples may comprise elements or portions having a static electric charge and/or one or more magnetic particles. This enables efficient reorientation of the biological samples.

In a preferred embodiment, the reorientation unit is configured to manipulate the orientation hydrodynamically. For example, the reorientation unit may comprise a flow obstacle inside the channel, which influences the flow of the fluid in the main channel such that the orientation of the biological samples is changed. Alternatively or in addition, the reorientation unit may comprise a pressure source that generates negative or positive pressure inside the channel in order to manipulate the orientation of the biological samples. In a particular embodiment, the flow obstacle and/or pressure source are positioned on the inside of the walls of the channel unilaterally. This enables efficient reorientation of the biological samples.

In a preferred embodiment, the reorientation unit is configured to manipulate the orientation optically. For example, the reorientation unit may comprise a focused light beam that is configured to exert radiation pressure on the biological samples according to the general concept of optical tweezers. This enables efficient reorientation of the biological sample.

In a preferred embodiment, the biological samples are embedded in a polymeric compound, in particular a hydrogel. The biological samples embedded in a hydrogel may also be termed hydrogel beads. In a particular embodiment, the hydrogel beads have a spherical or spheroidal shape. This protects the biological samples and enables particular easy handling of the biological samples.

In a preferred embodiment, an interacting structure configured to be manipulated by the reorientation unit is further embedded in the polymeric compound. The interacting structure may be a ferromagnetic particle, for example, which may be manipulated by a magnetic field generated by the reorientation unit. This enables particularly efficient manipulation of the orientation of the biological samples.

In a preferred embodiment, each hydrogel bead comprises a marker. The marker, also named an identifying marker, comprises a light absorbing, fluorescent and/or colored pattern, structure or distribution. The identifying marker can be optically read out by means of detecting the phase, the frequency, the polarization and/or the amplitude of light coming from the identifying marker, for example, by means of the imaging unit. The identifying marker are generated or included during or after embedding of the sample part. This enables the identification of each hydrogel bead. Therefore, each embedded sample part can be identified. As an example for a hydrogel bead comprising a marker, reference is made to the applications PCT/EP2021/058785 and PCT/EP2021/061754, the content of which is full incorporated herein by reference.

In a further aspect a method for imaging biological samples with the imaging system is provided, comprising the following steps: transporting the biological samples in a fluid through at least one main channel having at least one imaging space; manipulating the orientation of the biological samples in the fluid by means of at least one reorientation unit; receiving detection light emitted by the biological samples in the imaging space for imaging the samples by means of at least one imaging unit.

The method has the same advantages as the imaging system and may be incorporate embodiments directed to the imaging system.

FIG. 1 shows an imaging system 100 for imaging biological samples 102 according to a first embodiment. The imaging system 100 comprises a main channel 104 for transporting the biological samples 102 in a fluid, and in a particular embodiment, an aqueous liquid such as a buffer solution. This means that the channel 104 is filled with the fluid and the biological samples 102 are suspended, or at least partially submerged, in the fluid.

The main channel 104 may be a microfluidic channel and part of a microfluidic system. Further, the main channel 104 may be manufactured as part of the microfluidic system. The main channel 104 has a cross sectional area in a range between 100 µm2 and 1 mm2. Alternatively, the main channel 104 may have a round cross section and/or the main channel 108 may be a tube. The biological samples 102 may be transported through the main channel 104 by applying positive and/or negative pressure at the respective ends of the main channel 104, for example, by means of a pump (not shown). The consequently generated flow of the fluid carries the samples 102 through the main channel 104. The direction of flow is indicated the arrow with reference sign 106 in FIG. 1. The main channel 104 comprises walls defining the channel 104 made of glass, and/or a polymer, such as, polydimethylsiloxane, polyimide, polymethylmethacrylate, and/or polycarbonate.

The main channel 104 comprises three imaging spaces 114. The three imaging spaces 114 are separated from each other along the main channel 104. Each imaging space 114 is a section of the main channel 104 configured to enable detection light emitted from the biological samples 102 in the respective imaging space 114 to be captured from outside the main channel 104 or rather from outside the respective imaging space 114. To that end, the section of the main channel 104 that is the imaging space 114 comprises a transparent wall of the main channel 104. Through this transparent wall the biological samples 114 may be imaged when they are in one of the imaging spaces 114. The transparent wall of the main channel 104 may be made of glass, polycarbonate, cyclic olefin, cyclic olefin copolymers, fluorinated ethylene propylene or polydimethylsiloxane, for example. The section of the main channel 104 comprising the imaging space 114 may also be termed a flow cell.

In addition, the imaging space 114 may be further configured to enable illumination of the biological sample 102 in the imaging space 114 by illumination light from a light source outside the main channel 104. Similarly to the detection light, the transparent wall of the main channel 104 enables the illumination light to enter the imaging space 114.

Alternatively to the configuration shown in FIG. 1, the main channel 104 may comprise at least one imaging space 114 in an alternative embodiment, each imaging space 114 separated from each other.

The biological samples 102 may in particular comprise single cells, several individual cells (for example, in a co-culture), or a (or several) cluster of cells. Examples of cell clusters are spheroids, organoids or a tissue biopsy. Further, the biological samples 102 may be such cells embedded in a polymeric compound, and in a particular embodiment, a hydrogel. In FIG. 1 a hydrogel bead 108 comprising several individual cells 110 is exemplarily shown.

The hydrogel bead 108 may comprise several different portions. For example, the hydrogel bead 108 may comprises portions such as an inner core and an outer layer around the core. Each of the portions can be made of a particular polymeric compound. Moreover, the portions may be made of other compounds that do not form hydrogels. Thus, the portions of the hydrogel bead 108 may each have different properties. These properties include physicochemical properties such as Young's modulus, refractive index, and chemical composition and functionalization.

The shape of the hydrogel bead 108 is spherical. Alternatively, the hydrogel bead 108 may have a different shape such as a spheroid. The diameter of the hydrogel bead 108 is in the range of 15 µm to 10 mm. In preferred embodiments, preferred ranges are 15 µm to 100 µm, 50 µm to 250 µm and/or 500 µm to 1 mm.

The hydrogel bead 108 can be formed, for example, by electrospray, emulsification, lithography, 3D printing and microfluidic approaches. During formation of the hydrogel bead 108 further compounds and structures can be included in the hydrogel bead 108. For example, the cells 110 may be included in the hydrogel bead 108.

Further information about the generation of hydrogel beads comprising a biological sample is disclosed in the application PCT/EP2021/063334, the content of which is fully incorporated herein by reference.

In addition, the hydrogel bead 108 may comprise an identifying marker. The identifying marker comprises a light absorbing, fluorescent and/or colored pattern, structure or distribution. For example, the identifying marker comprises a plurality of microbeads 112, and in a particular embodiment, fluorescent microbeads. The microbeads are included and randomly dispersed in the hydrogel bead 108 during the formation of the hydrogel bead 108.

The identifying marker can be optically read out by means of detecting the phase, the frequency, the polarization and/or the amplitude of light coming from the identifying marker. The identifying marker can be generated or included during or after embedding of the cells 110 in the bead 108. For example, the identifying marker may be generated by means of lithography, in a particular embodiment, by photolithography, 2-photon lithography, or multi-photon lithography. Compounds can be included in the hydrogel bead 108 that can be activated, deactivated or bleached photochemically during or after formation of the hydrogel bead 108. In a subsequent lithographic, and in a particular embodiment, in a photolithographic step, the compounds may be activated, deactivated or bleached photochemically by means of a focused light beam, or by imaging or projecting a pattern on the hydrogel bead 108. Using photolithography three-dimensional patterns can be generated, comparable to barcodes. Such codes allow a large number of unique codes to be generated. This enables generating unique identifying markers in each hydrogel bead, such that each hydrogel bead is distinguishable from other hydrogel beads. Thus, each hydrogel bead is identifiable by its identifying marker. Further information about a hydrogel bead comprising a marker is disclosed in the applications PCT/EP2021/058785 and PCT/EP2021/061754, the content of which is fully incorporated herein by reference.

The imaging system 100 further comprises an imaging unit 115 for imaging the biological sample when they are in the imaging spaces 114. The imaging unit 115 is a microscope, and in a particular embodiment, a light-sheet microscope, for example, an oblique plane microscope. In a particular embodiment, the imaging unit 115 might be embodied as e.g. described in the application having the application number EP21200992 or as described in the application having the application number EP21201008. The imaging unit 115 may at least receive the detection light emitted from the biological sample 102 when it is in one of the imaging spaces 114 of the main channel 102. In a particular embodiment, a detection plane 116 of the microscope, also termed a focus plane, is at least partially within all three imaging spaces 114. That means the detection plane 116 intersects with the main channel 104 in the imaging spaces 114, and in a preferred embodiment, at the same angle in each of the three imaging spaces 114. The microscope receives detection light from the detection plane 116 for imaging the biological samples 102 in the imaging spaces 114. In addition, the imaging unit 115 may also be used to image the marker of the hydrogel bead 108, and in a particular embodiment, its microbeads 112.

Further, the imaging unit 115 may illuminate the biological sample 102 in the imaging spaces 114 with illumination light. For example, in case the imaging unit 115 is a light-sheet microscope, the detection plane 116 is illuminated with illumination light.

Alternatively, there may be more than one imaging device, for example, a dedicated imaging device for each imaging space 114.

In a preferred embodiment, the biological samples 102 are individualized and transported through the main channel 104 with a distance to each other, such that only one of the biological samples 102 is in any one of the imaging spaces 114 at a point in time. This enables imaging the biological samples 102 individually as they flow through the respective imaging space 114. Since the biological samples 102 pass all three imaging spaces 114 as the biological samples 102 are transported through the main channel 104, each biological sample 102 may be imaged in each of the imaging spaces 114, generating three sets of image data for each imaging space 114 respectively.

In addition, as the biological sample 102 moves through each imaging space 114 it moves through the (schematically depicted) detection plane 116. Thus, each biological sample 102 may be imaged several times as it passes through any one of the imaging spaces 114. This generates a set of image data with a plurality of parallel images, also termed an image stack or a z-stack. Such an image stack enables generating a three-dimensional representation of the respective biological sample 102. In summary, each biological sample 102 may be imaged in each imaging space 114, and within each imaging space 114 a plurality of images may be generated of a particular one of the biological samples 102. In an embodiment, it is preferred to combine the sets of image data from each imaging space 114 for a particular biological sample to generate a three-dimensional representation with improved image quality, for example, with respect to image resolution.

Furthermore, the imaging system 100 comprises two reorientation units 118. The reorientation units 118 are configured to reorient the biological samples 102 in the fluid in the main channel 104. This means the reorientation units 118 can manipulate the orientation of the biological samples 102, for example, by turning the biological samples 102 around a rotation axis of the respective biological sample 102. The reorientation units 118 are arranged along the main channel 104 between the imaging spaces 114. This enables changing the orientation of the biological samples 102 between imaging the biological samples 102 in the respective imaging spaces 114. This ensures that the biological samples 102 may be imaged in different orientations in the imaging spaces 114. Further, the reorientation units 118 may be arranged outside the main channel 104, inside the main channel 104, and/or as part of the wall of the main channel 104.

The reorientation units 118 can be one of several of the following types of reorientation units.

For example, a first type of reorientation unit manipulates the orientation of the samples 102 electrodynamically. Specifically, this may be achieved by applying a magnetic field to the main channel 104 and the biological samples 102 and/or the hydrogel bead 108 being influenced by the magnetic field. To this end the reorientation unit may comprise a magnet or an electromagnet. Further, the biological samples 102 and/or the hydrogel bead 108 may comprise ferromagnetic particles.

A second type of reorientation unit manipulates the orientation of the samples 102 hydrodynamically. This may be achieved by providing a flow obstacle within the main channel 104, which influences the flow of the fluid in the main channel 104 such that the orientation of the biological samples 102 is changed, e.g. such that a flow obstacle or e.g. a shape of the main channel generate a fluid flow—and in a preferred embodiment, in a laminar manner—which is suitable to manipulate the orientation of the samples 102 hydrodynamically. Alternatively or in addition, a locale pressure source may be provided, which influences the flow of the fluid in the main channel 104.

A third type of reorientation unit manipulates the orientation of the samples 102 optically. The third type of reorientation unit applies the general concept of optical tweezers. The manipulation of the orientation may be achieved by providing a focused light beam that is configured to apply an attractive or repulsive force on the biological sample 102 and/or the hydrogel bead 108 within the main channel 104. This attractive or repulsive force is also termed radiation pressure.

The reorientation units 118 may all be of the same type or of different types mentioned above.

Similarly to the main channel 104 with the imaging spaces 114, the reorientation unit 118 may be part of the microfluidic system.

As discussed above, each biological sample 102 may be imaged in each imaging space 114, and in each imaging space 114 a plurality of images may be generated of a particular one of the biological samples 102 as the biological sample is trans-ported through the imaging space 114. Since the reorientation units 118 are arranged between the imaging spaces 114, the orientation of the biological samples 102 may be manipulated between the imaging spaces 114. Thus, each biological sample 102 can be moved into a different orientation between the imaging spaces 114 and a particular one of the biological samples 102 is imaged in a different orientation in each imaging space 114. For example, the angle at which the particular biological sample 102 intersects with the detection plane 116 is different in each imaging space 114. Therefore, the sets of image data gathered for a particular biological sample 102 in each imaging space 114 differ between each other in the angle at which the image or images are taken. The different angles may also be termed as different views. By combining the sets of image data from each view, a three-dimensional multi-view representation of the particular biological sample 102 may be generated. This enables generating a three-dimensional representation with particularly improved image quality.

Figure 2:
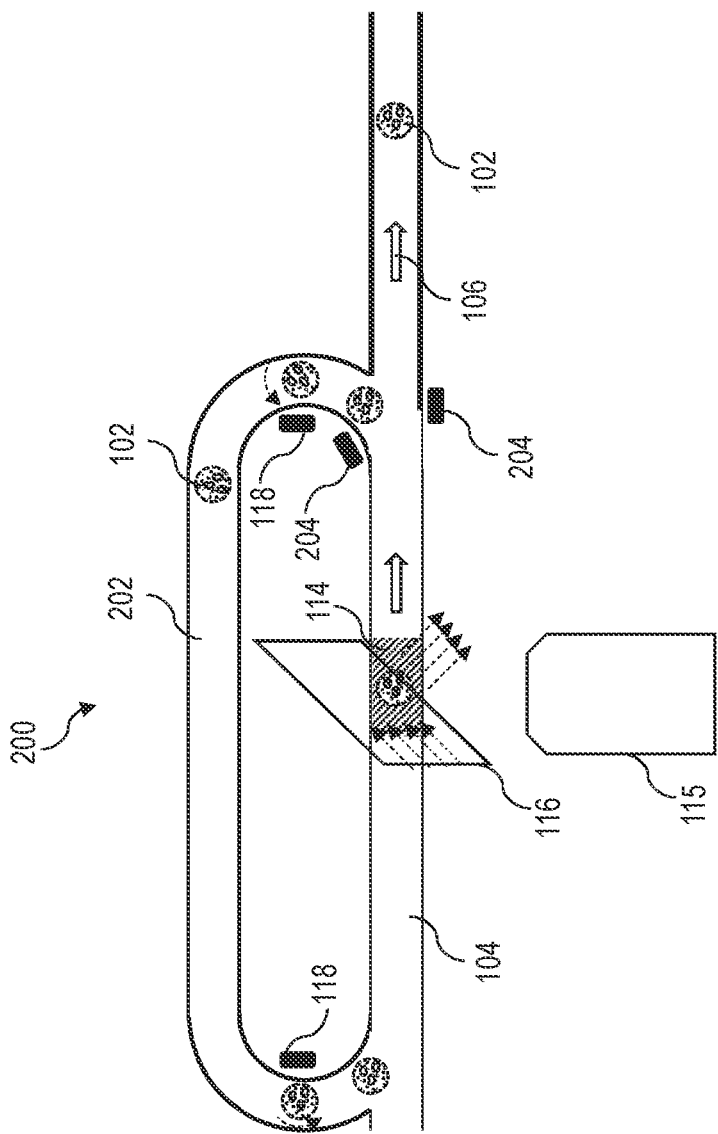
FIG. 2 shows an imaging system according to a second embodiment with a circulation channel.

FIG. 2 shows an imaging system 200 for imaging the biological samples 102 according to a second embodiment. Elements with the same structure and function have the same reference signs. The imaging system 200 comprises the main channel 104 for transporting the biological samples 102 in the fluid. In addition, the imaging system 200 comprises a circulation channel 202. The circulation channel 202 is in fluid connection with the main channel 104 upstream and downstream of the imaging space 114. This enables imaging the biological sample repeatedly in the imaging space 114 by the imaging unit 115 by routing the biological samples 102 through the circulation channel 202. Moreover, the circulation channel 202 may have the same dimensions as the main channel 104. The reorientation units 118 may be arranged such that they manipulate the orientation of the biological samples 102 inside the main channel 104 and/or the circulation channel 202. In any case, at least one reorientation unit 118 is arranged such that it can change the orientation of the biological samples 102 either in the circulation channel 202 or in the section of the main channel 104, which is bypassed by the circulation channel 202. Thus, each biological sample 102 may be imaged in the imaging space 114 several times, and each time it passes the imaging space 114 a plurality of images may be generated of a particular one of the biological samples 102 as the biological sample is transported through the imaging space 114.

The imaging system 200 comprises a routing unit 204 that is configured to selectively route biological samples through the circulation channel 202 or the main channel 104. This may be achieved by generating a positive or negative pressure that forces the biological sample 102 in the circulation channel 202. Alternatively or in addition, the routing unit 204 comprises a routing element that is arranged in the main channel 104 and that can be moved between a position in which the biological samples 102 are routed through the circulation channel 202 and a position in which the biological samples are routed along the main channel 104 in direction of the direction of flow 106.

Figure 3:
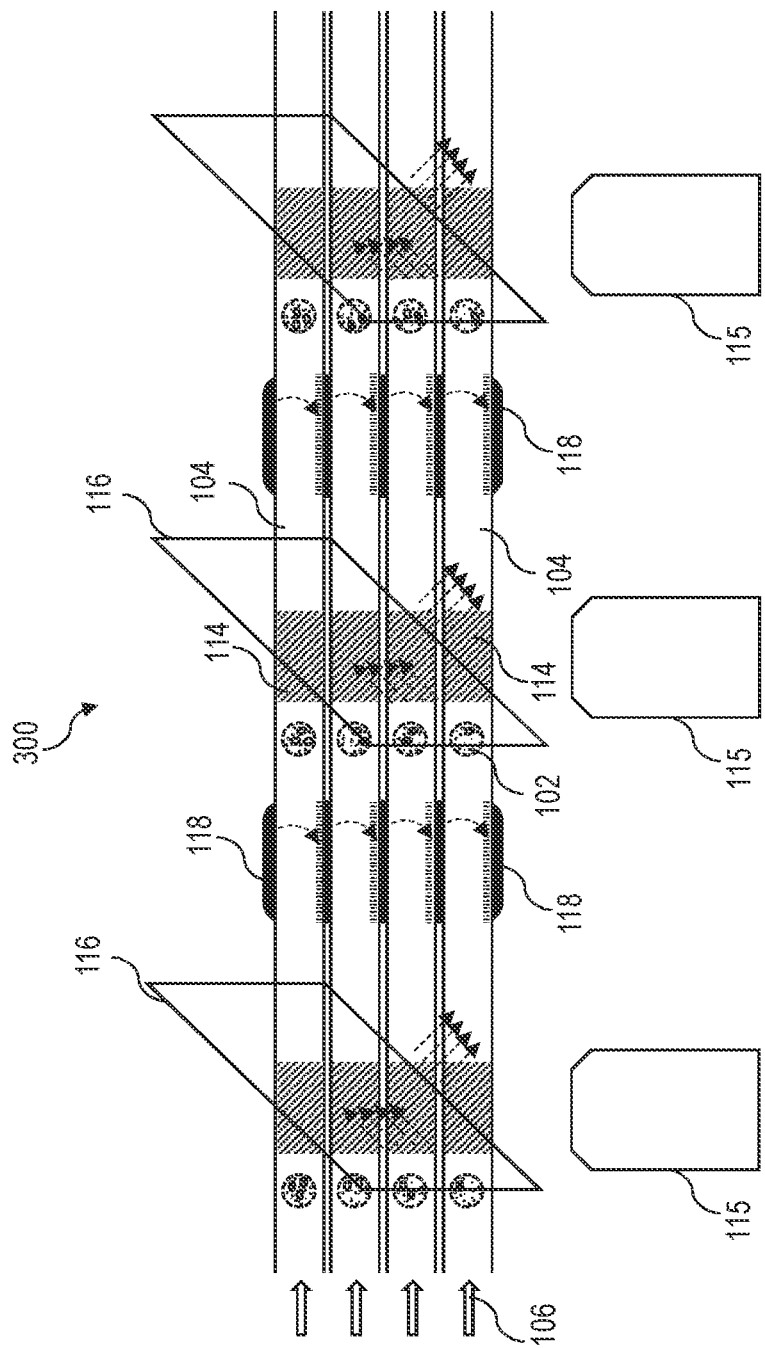
FIG. 3 shows an imaging system according to a third embodiment with multiple main channels.

FIG. 3 shows an imaging system 300 for imaging the biological samples 102 according to a third embodiment. The imaging system 300 comprises four main channels 104 for transporting the biological samples 102 in the fluid. Each of the main channels 104 comprise imaging spaces 114 and reorientation units 118, as described above. The use of several main channels 104 enables parallelizing the imaging of the biological samples 102 by the imaging unit 115 in order to speed up the imaging.

The imaging system comprises three imaging units 115 that each image the biological samples 102 in a set of four of the imaging spaces 114. Alternatively, at least a single imaging unit 115 may be provided for imaging the biological samples 102.

As discussed above, each biological sample 102 may be imaged in each imaging space 114 of one of the main channels 104, and in each imaging space 114 a plurality of images may be generated of a particular one of the biological samples 102 as the biological sample is transported through the imaging space 114.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100, 200, 300 Imaging system
102 Biological sample
104 Main channel
106 Direction of flow
108 Hydrogel bead
110 Cell
112 Microbead
114 Imaging space
115 Imaging unit
116 Detection plane
118 Reorientation unit
202 Circulation channel
204 Routing unit

The invention claimed is:

1. An imaging system for imaging biological samples, the imaging system comprising:
at least one main channel comprising at least two imaging spaces, the at least one main channel configured to transport the samples in a fluid along a flow direction, wherein the at least two imaging spaces are separated apart from each other along the flow direction;
at least one reorientation unit configured to manipulate an orientation of the samples in the fluid, wherein the at least one reorientation unit is arranged between the at least two imaging spaces along the flow direction; and
at least one imaging unit configured to receive detection light emitted by the samples in at least one of the at least two imaging spaces.

2. The imaging system according to claim 1, wherein the at least one imaging unit is configured to receive the detection light emitted by the samples in the at least two imaging spaces.

3. The imaging system according to claim 1, comprising two imaging units, each of the two imaging units configured to receive the detection light emitted by the samples in a respective one of the at least two imaging spaces of the at least one main channel.

4. The imaging system according to claim 1, wherein the at least one imaging unit comprises a light sheet microscope.

5. The imaging system according to claim 1, wherein the at least one imaging unit is configured to capture a z-stack of the samples.

6. The imaging system according to claim 1, comprising at least two main channels.

7. The imaging system according to claim 6, wherein the at least one imaging unit is configured to receive the detection light emitted by the samples in the at least one imaging space of each of the at least two main channels.

8. The imaging system according to claim 1, wherein the at least one reorientation unit is configured to manipulate the orientation of the samples electrodynamically, hydrodynamically, and/or optically.

9. The imaging system according to claim 1, wherein the samples are embedded in a polymeric compound.

10. The imaging system according to claim 9, wherein an interacting structure configured to be manipulated by the at least one reorientation unit is further embedded in the polymeric compound.

11. The imaging system according to claim 9, wherein the samples are embedded in a hydrogel.

12. An imaging system for imaging biological samples, the imaging system comprising:
  at least one main channel comprising at least one imaging space, the at least one main channel configured to transport the samples in a fluid;
  at least one reorientation unit configured to manipulate an orientation of the samples in the fluid;
  at least one imaging unit configured to receive detection light emitted by the samples in the at least one imaging space, and
  a circulation channel that is in fluid connection with the at least one main channel upstream and/or downstream of the at least one imaging space.

13. A method for imaging biological samples with an imaging system, the method comprising:
  transporting the samples in a fluid through at least one main channel along a flow direction, the at last one main channel comprising at least two imaging spaces separated apart from each other along the flow direction;
  manipulating an orientation of the samples in the fluid by at least one reorientation unit arranged between the at least two imaging spaces along the flow direction; and
  receiving detection light emitted by the samples in at least one of the at least two imaging spaces by at least one imaging unit.

14. The method according to claim 13, wherein a z-stack of the samples is captured by the at least one imaging unit.

* * * * *